(12) United States Patent
Cheng et al.

(10) Patent No.: US 11,820,853 B2
(45) Date of Patent: Nov. 21, 2023

(54) IMPACT-RESISTANT AND AGING-RESISTANT REFLECTIVE PLASTIC APPLIED TO AUTOMOBILES

(71) Applicant: SHENZHEN JINZHICHENG PLASTIC TECHNOLOGY CO., LTD., Shenzhen (CN)

(72) Inventors: Zhicheng Cheng, Shenzhen (CN); Yong Cheng, Shenzhen (CN); Jianping Xu, Shenzhen (CN)

(73) Assignee: SHENZHEN JINZHICHENG PLASTIC TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/867,055

(22) Filed: Jul. 18, 2022

(65) Prior Publication Data
US 2023/0056991 A1    Feb. 23, 2023

(30) Foreign Application Priority Data

Aug. 12, 2021 (CN) .......................... 202110926394.3

(51) Int. Cl.
| | |
|---|---|
| *C08G 18/48* | (2006.01) |
| *C08K 3/30* | (2006.01) |
| *C08G 18/18* | (2006.01) |
| *C08K 9/06* | (2006.01) |
| *C08K 9/04* | (2006.01) |
| *C08G 18/76* | (2006.01) |
| *C08K 7/26* | (2006.01) |

(52) U.S. Cl.
CPC ......... *C08G 18/4837* (2013.01); *C08G 18/18* (2013.01); *C08G 18/48* (2013.01); *C08G 18/76* (2013.01); *C08K 3/30* (2013.01); *C08K 7/26* (2013.01); *C08K 9/04* (2013.01); *C08K 9/06* (2013.01); *C08G 2150/00* (2013.01); *C08K 2003/3036* (2013.01)

(58) Field of Classification Search
CPC .... C08G 18/48; C08G 18/18; C08G 18/4837; C08G 18/76; C08K 9/06; C08K 9/04; C08K 7/26; C08K 3/30
See application file for complete search history.

(56) References Cited

FOREIGN PATENT DOCUMENTS

CN          109135530       *    1/2019    ......... C08G 18/0823

OTHER PUBLICATIONS

CN—109135530_Jun. 2019_English Translation.*

* cited by examiner

*Primary Examiner* — Michael L Leonard
(74) *Attorney, Agent, or Firm* — Perry + Currier Inc.

(57) ABSTRACT

Disclosed is an impact-resistant and aging-resistant reflective plastic applied to an automobile, which is prepared by copolymerizing of polyether polyol, 4,4,4-triphenylmethane triisocyanate and a benzimidazole derivative modified ZnS-mesoporous silica composite, the benzimidazole derivative modified ZnS-mesoporous silica composite is a ZnS-mesoporous silica composite modified by an anti-aging agent and a silane coupling agent KH-560, the ZnS-mesoporous silica is obtained by mixing an amphoteric surfactant, zinc chloride, and γ-aminopropyltrimethoxysilane uniformly, then reacting in ethyl orthosilicate, and calcining with hydrogen sulfide. In the present disclosure, by dispersing zinc sulfide in the pores of mesoporous carbon dioxide, chemical grafting 2-(2-hydroxy-5-aminophenyl)benzimidazole as a bridge onto isocyanate, and then polymerizing into polyurethane, which can improve the reflective performance and aging resistance of polyurethane, and improve the abrasion resistance and impact resistance.

7 Claims, No Drawings

IMPACT-RESISTANT AND AGING-RESISTANT REFLECTIVE PLASTIC APPLIED TO AUTOMOBILES

CROSS REFERENCE TO RELATED APPLICATION

This patent application claims the benefit and priority of Chinese Patent Application No. 202110926394.3 filed on Aug. 12, 2021, the disclosure of which is incorporated by reference herein in its entirety as part of the present application.

TECHNICAL FIELD

The present disclosure relates to the technical field of plastics, in particular to an impact-resistant and aging-resistant reflective plastic applied to automobiles.

BACKGROUND ART

With the improvement of people's quality of life, the demands for material life are getting higher and higher, and the number of family ownership of cars is also increasing. Plastic has high elasticity, so it is widely used in automobile tires, seals, wipers, warning stickers, etc. When a car is running, the distance between the cars is too close to easily lead to accidents, especially at night, which increases the difficulty of controlling the distance of the cars. The use of reflective plastic can effectively warn the following car of the position of the car in front to control the distance. At the same time, a car is an outdoor product, exposed to the sun for a long time, it is prone to aging, resulting in a decline in its mechanical properties and stability. However, in the traditional reflective plastic, a reflective film made with a reflective unit is composited into the plastic, which has weak reflective performance, is not abrasion-resistant, easy to age, and has a short service life.

Zinc sulfide is a fluorescent material with luminescent properties, because of its excellent physical properties, such as wide band gap, high refractive index, high light transmittance in the visible light range, it has a huge potential for optical applications. Mesoporous silica is a nanomaterial with huge surface area and void volume, its mechanical properties and structure are stable, and it has broad research prospects.

The Chinese Patent Publication No. CN108623978A discloses a method for preparing a TPE material for reflecting light, comprising the steps: a. Mixing in a mixer, first using a SEBS rubber resin to fully absorb a plastic processing oil, and then mixing the softened SEBS rubber resin after absorbing plastic processing oil, PP, a bismaleimide resin, pearl powder, and additives thoroughly in proportion to obtain a mixture; b. Adding the mixture to a twin-screw extruder with a length-to-diameter ratio of 32:1-38:1, an extrusion temperature of 210-250° C. and a rotation speed of 300-500 rpm for melt mixing; c. Successively extruding, drawing, air cooling, pelletizing and drying to obtain the TPE material for reflecting light. The present disclosure improves the reactive grafting effect of the raw materials in the twin-screw extruder, and better improves the stress resistance and tensile strength of the material. However, in the patent application, the substances are compounded by blending with resins, and the dispersibility and stability of each substance is poor. The pearl powder as a reflective agent is easy to reduce the reflective performance due to the friction of the plastic.

SUMMARY

(1) Technical Problems Solved

The purpose of the present disclosure is to provide an impact-resistant and aging-resistant reflective plastic applied to an automobile, which solves the problem of easy loss of reflectivity and easy aging of automobile reflective plastic parts.

(2) Technical Schemes

In order to solve the above problems, the present disclosure provides the following technical schemes:

An impact-resistant and aging-resistant reflective plastic applied to an automobile, wherein being prepared by copolymerizing of polyether polyol, 4,4,4-triphenylmethane triisocyanate and a benzimidazole derivative modified ZnS-mesoporous silica composite, the benzimidazole derivative modified ZnS-mesoporous silica composite is a ZnS-mesoporous silica composite modified by an anti-aging agent and a silane coupling agent KH-560, the ZnS-mesoporous silica is obtained by mixing an amphoteric surfactant, zinc chloride, and γ-aminopropyltrimethoxysilane uniformly, then reacting in ethyl orthosilicate, and calcining with hydrogen sulfide.

In some embodiments, the anti-aging agent is 2-(2-hydroxy-5-aminophenyl) benzimidazole, and the amphoteric surfactant is sodium N-lauroylglutamate.

In some embodiments, the polyether polyol is prepared by using ethylene oxide and propylene oxide as raw materials to carry out a ring-opening polymerization under the action of a catalyst and an initiator, the catalyst is any one of KOH, NaOH, Na or NaH, and the initiator is one or more of diethylene glycol, glycerol, pentaerythritol and sorbitol.

A method for preparing the impact-resistant and aging-resistant reflective plastic applied to an automobile, wherein comprising the following steps:

(a1) Dissolving sodium N-lauroylglutamate in a 0.5 M sodium hydroxide solution, titrating with a hydrochloric acid solution to neutrality, adding zinc chloride, adjusting the pH of the solution to 8, ultrasonically dispersing uniformly, adding γ-aminopropyltrimethoxysilane and mixing uniformly, then adding ethyl orthosilicate to the above solution, stirring vigorously to obtain a suspension, after standing for 48 h, filtering to obtain a resulting precipitate, drying at room temperature, then calcining at 550° C. for 6 h in an air atmosphere, and then calcining with hydrogen sulfide to obtain a ZnS-mesoporous silica composite;

(a2) Adding the ZnS-mesoporous silica composite to a N-methylpyrrolidone solvent, dispersing ultrasonically for 30 min, adding a N-methylpyrrolidone solution containing a silane coupling agent KH-560 to perform a reaction, separating by centrifugation, filtering and washing the precipitate, then drying in an oven at 60° C. for 24 h to obtain an epoxy-grafted ZnS-mesoporous silica composite;

(a3) Adding the epoxy-grafted ZnS-mesoporous silica composite prepared in step (a2) and 2-(2-hydroxy-5-aminophenyl)benzimidazole to a tetrahydrofuran solvent, ultrasonically dispersing uniformly, after the completion of the reaction, filtering, washing and drying to obtain a benzimidazole derivative modified ZnS-mesoporous silica composite;

(a4) Adding 4,4,4-triphenylmethane triisocyanate and the benzimidazole derivative modified ZnS-mesoporous silica composite into a dichloromethane solvent, adding triethylamine as a catalyst, ultrasonically dispersing uniformly, after the reaction, centrifuging and filtering to obtain a precipitate, washing the precipitate with acetone and drying to obtain an isocyanate modified by the benzimidazole derivative modified ZnS-mesoporous silica;

(a5) Adding the isocyanate modified by the benzimidazole derivative modified ZnS-mesoporous silica obtained in step (a4) to a tetrahydrofuran solvent, adding dropwise to a tetrahydrofuran solution containing polyether polyol under stirring, ultrasonically dispersing uniformly, when bubbles are generated, adding a 30 wt % acetone dropwise to reduce the viscosity, then stirring and dispersing, removing the acetone solvent using a rotary evaporator to obtain an aqueous polyurethane emulsion, and drying to obtain an impact-resistant and aging-resistant reflective plastic.

In some embodiments, the mass ratio of sodium N-lauroylglutamate, zinc oxide, γ-aminopropyl trimethoxysilane and ethyl orthosilicate in step (a1) is 1:3-8:2-3:5-10.

In some embodiments, in step (a1), the flow rate of hydrogen sulfide is 50-100 ml/min, and the calcination time is 15-35 min.

In some embodiments, the mass of the silane coupling agent KH-560 in step (a2) is 5-15% of the mass of the ZnS-mesoporous silica composite, In some embodiments, the reaction in step (a2) are under a nitrogen atmosphere for 8-12 h.

In some embodiments, the mass ratio of epoxy-grafted ZnS-mesoporous silica composite and 2-(2-hydroxy-5-aminophenyl)benzimidazole in step (a3) is 15-18:20-25.

In some embodiments, the reaction in step (a3) is at room temperature for 8 h.

In some embodiments, the mass ratio of 4,4,4-triphenylmethane triisocyanate, the benzimidazole derivative modified ZnS-mesoporous silica composite and the catalyst in step (a4) is 10-20:3-7:0.1-0.5, and the drying in step (a4) is drying in an oven at 60° C. for 12 h.

In some embodiments, the mass ratio of the isocyanate modified by the benzimidazole derivative modified ZnS-mesoporous silica to the polyether polyol in step (a5) is 3-6:3-4.

In some embodiments, the reaction in step (a5) is heating to 70-80° C. and reacting for 12-18 h under the protection of nitrogen, and the drying in step (a5) is drying in a vacuum oven at 60° C. for 24 h.

The beneficial effects of the present disclosure are as follows:

(1) The present disclosure provides a method for preparing an impact-resistant and aging-resistant reflective plastic applied to automobiles. It uses ethyl orthosilicate as a silicon source, and metal micelles of sodium N-lauroylglutamate and $Zn^{2+}$ combined by electrostatic interactions as the template, to synthesize a silicon oxide containing zinc ions by one step. The resulting silicon oxide is calcined in air to remove the surfactant to obtain a mesoporous silica with zinc oxide evenly distributed in the pores. Then it is calcined with hydrogen sulfide to make the zinc oxide react with hydrogen sulfide to obtain zinc sulfide, and to obtain a ZnS-mesoporous silica composite with zinc sulfide highly dispersed in the pores. Then it is modified by silane coupling agent to obtain an epoxy-grafted ZnS-mesoporous silica composite, the anti-aging agent 2-(2-hydroxy-5-aminophenyl)benzimidazole is used as a bridge, the amino group at one end is connected with the epoxy group through a ring-opening reaction, the phenolic hydroxyl group at the other end is mixed and reacted with 4,4,4-triphenylmethane triisocyanate to obtain an isocyanate modified by the benzimidazole derivative modified ZnS-mesoporous silica, and then it is polymerized with polyether polyol. The method successfully grafts the benzimidazole derivative modified ZnS-mesoporous silica composite onto the polyurethane matrix through chemical bonds, which greatly improves the dispersion and stability of zinc sulfide and mesoporous silica in the polyurethane.

(2) The impact-resistant and aging-resistant reflective plastic applied to automobiles provided by the present disclosure is rich in anti-aging molecules. There are hydrogen bonds in the molecules of benzotriazole, when exposed to ultraviolet light, the hydrogen bonds will be broken and form optical tautomers, thereby turning harmful ultraviolet light into harmless heat energy. At the same time, zinc sulfide can effectively absorb and reflect ultraviolet light, the silica crystal structure can refract light, which greatly improves the aging resistant performance and reflective performance of the plastic. When the following car is too close to the car in front, it can clearly remind people that there is a car in front, and remind the following car to keep the distance, so as to avoid the occurrence of accidents.

(3) In the impact-resistant and aging-resistant reflective plastic applied to automobiles provided by the present disclosure, the benzimidazole derivative modified ZnS-mesoporous silica composite is uniformly dispersed in the polyurethane plastic matrix, when the plastic is subjected to external force, the uniformly dispersed mesoporous silica and zinc sulfide can effectively disperse the stress through its own high strength, thereby improving the impact resistance and mechanical properties of the plastic, and also enhancing the abrasion resistance of the reflective plastic, without affecting the absorption and reflection of light by the reflective material.

DETAILED DESCRIPTION OF THE EMBODIMENTS

The present disclosure will be further described below in conjunction with specific embodiments, and the following examples are intended to illustrate the present disclosure but not to further limit the present disclosure. The technical means used in the following examples are conventional means well known to those skilled in the art, and all raw materials are common materials.

EXAMPLE 1

A method for preparing impact-resistant and aging-resistant reflective plastic applied to automobiles, the specific preparation process is as follows:

(a1) 1 g of sodium N-lauroylglutamate was dissolved in a 0.5 M sodium hydroxide solution, titrated with a hydrochloric acid solution to neutrality, 5 g of zinc chloride was added, the pH was adjusted to 8, the mixture was ultrasonically dispersed uniformly, 2 g of γ-aminopropyltrimethoxysilane was added and mixed uniformly, then 8 g of ethyl orthosilicate was added to the above solution, stirred vigorously to obtain a suspension, after standing for 48 h, filtered to obtain a resulting precipitate, dried at room temperature, then calcined at 550° C. for 6 h in an air atmosphere, then hydrogen sulfide was introduced at a flow rate of 75 ml/min, and the resulting solid was calcined for 30 min to obtain a ZnS-mesoporous silica composite;

(a2) 5 g of ZnS-mesoporous silica composite was added to 100 ml of N-methylpyrrolidone solvent, ultrasonically dispersed for 30 min, a N-methylpyrrolidone solution containing 0.5 g of silane coupling agent KH-560 was added to perform a reaction, the product was separated by centrifugation, and the resulting precipitate was filtered, washed, and dried in an oven at 60° C. for 24 h to obtain an epoxy-grafted ZnS-mesoporous silica composite;

(a3) 5 g of the epoxy-grafted ZnS-mesoporous silica composite prepared in step (a2) and 6.5 g of 2-(2-hydroxy-5-aminophenyl)benzimidazole were added to 200 ml of tetrahydrofuran solvent, ultrasonically dispersed uniformly, after the reaction was completed, the product was filtered, washed and dried to obtain a benzimidazole derivative modified ZnS-mesoporous silica composite;

(a4) 12 g of 4,4,4-triphenylmethane triisocyanate and 5 g of benzimidazole derivative modified ZnS-mesoporous silica composite were added to 200 ml of dichloromethane solvent, 0.3 g of triethylamine was added as a catalyst, ultrasonically dispersed uniformly, after the reaction, the product was centrifuged and filtered to obtain a precipitate, the precipitate was washed with acetone, dried in a 60° C. oven for 12 h to obtain an isocyanate modified by the benzimidazole derivative modified ZnS-mesoporous silica;

(a5) 10 g of the isocyanate modified by the benzimidazole derivative modified ZnS-mesoporous silica prepared in step (a4) was added to 150 ml of tetrahydrofuran solvent, the resulting solution was added dropwise to 100 ml of tetrahydrofuran solution containing 15 g of polyether polyol under stirring, ultrasonically dispersed uniformly, and the solution was heated to 70° C. and reacted for 12 h under nitrogen protection. When bubbles were generated, 30 wt % acetone was added dropwise to reduce the viscosity, the dispersion was continued with stirring, then the acetone solvent was removed with a rotary evaporator to obtain a water-based polyurethane emulsion, and the emulsion was dried in a vacuum oven at 60° C. for 24 h to obtain an impact-resistant and aging-resistant reflective plastic.

EXAMPLE 2

A method for preparing impact-resistant and aging-resistant reflective plastic applied to automobiles, the specific preparation process is as follows:

(a1) 1 g of sodium N-lauroylglutamate was dissolved in a 0.5 M sodium hydroxide solution, titrated with a hydrochloric acid solution to neutrality, 4 g of zinc chloride was added, the pH was adjusted to 8, the mixture was ultrasonically dispersed uniformly, 2 g of γ-aminopropyltrimethoxysilane was added and mixed uniformly, then 6 g of ethyl orthosilicate was added to the above solution, stirred vigorously to obtain a suspension, after standing for 48 h, filtered to obtain a resulting precipitate, dried at room temperature, then calcined at 550° C. for 6 h in an air atmosphere, then hydrogen sulfide was introduced at a flow rate of 50 ml/min, and the resulting solid was calcined for 30 min to obtain a ZnS-mesoporous silica composite;

(a2) 8 g of the ZnS-mesoporous silica composite was added to 100 ml of N-methylpyrrolidone solvent, ultrasonically dispersed for 30 min, the N-methylpyrrolidone solution containing 1 g of silane coupling agent KH-560 was added to perform a reaction, the product was separated by centrifugation, and the precipitate was filtered, washed, and dried in an oven at 60° C. for 24 h to obtain an epoxy-grafted ZnS-mesoporous silica composite;

(a3) 6 g of the epoxy-grafted ZnS-mesoporous silica composite prepared in step (a2) and 10 g of 2-(2-hydroxy-5-aminophenyl)benzimidazole were added to 200 ml of tetrahydrofuran solvent, ultrasonically dispersed uniformly, after the reaction was completed, the product was filtered, washed and dried to obtain a benzimidazole derivative modified ZnS-mesoporous silica composite;

(a4) 10 g of 4,4,4-triphenylmethane triisocyanate and 6 g of benzimidazole derivative modified ZnS-mesoporous silica composite were added to 200 ml of dichloromethane solvent, 0.3 g of triethylamine was added as a catalyst, ultrasonically dispersed uniformly, after the reaction, the product was centrifuged and filtered to obtain a precipitate, the precipitate was washed with acetone, dried in a 60° C. oven for 12 h to obtain an isocyanate modified by the benzimidazole derivative modified ZnS-mesoporous silica;

(a5) 15 g of the isocyanate modified by the benzimidazole derivative modified ZnS-mesoporous silica prepared in step (a4) was added to 150 ml of tetrahydrofuran solvent, the resulting solution was added dropwise to 150 ml of tetrahydrofuran solution containing 20 g of polyether polyol under stirring, ultrasonically dispersed uniformly, and the solution was heated to 75° C. and reacted for 16 h under nitrogen protection. When bubbles were generated, 30 wt % acetone was added dropwise to reduce the viscosity, the dispersion was continued with stirring, then the acetone solvent was removed with a rotary evaporator to obtain a water-based polyurethane emulsion, and the emulsion was dried in a vacuum oven at 60° C. for 24 h to obtain an impact-resistant and aging-resistant reflective plastic.

EXAMPLE 3

A method for preparing impact-resistant and aging-resistant reflective plastic applied to automobiles, the specific preparation process is as follows:

(a1) 1 g of sodium N-lauroylglutamate was dissolved in a 0.5 M sodium hydroxide solution, titrated with a hydrochloric acid solution to neutrality, 7.5 g of zinc chloride was added, the pH was adjusted to 8, the mixture was ultrasonically dispersed uniformly, 2.5 g of γ-aminopropyltrimethoxysilane was added and mixed uniformly, then 10 g of ethyl orthosilicate was added to the above solution, stirred vigorously to obtain a suspension, after standing for 48 h, filtered to obtain a resulting precipitate, dried at room temperature, then calcined at 550° C. for 6 h in an air atmosphere, then hydrogen sulfide was introduced at a flow rate of 100 ml/min, and the resulting solid was calcined for 25 min to obtain a ZnS-mesoporous silica composite;

(a2) 10 g of the ZnS-mesoporous silica composite was added to 200 ml of N-methylpyrrolidone solvent, ultrasonically dispersed for 30 min, the N-methylpyrrolidone solution containing 1.2 g of silane coupling agent KH-560 was added to perform a reaction, the product was separated by centrifugation, and the precipitate was filtered, washed, and dried in an oven at 60° C. for 24 h to obtain an epoxy-grafted ZnS-mesoporous silica composite;

(a3) 8 g of the epoxy-grafted ZnS-mesoporous silica composite prepared in step (a2) and 12 g of 2-(2-hydroxy-5-aminophenyl)benzimidazole were added to 200 ml of tetrahydrofuran solvent, ultrasonically dispersed uniformly, after the reaction was completed, the product was filtered, washed and dried to obtain a benzimidazole derivative modified ZnS-mesoporous silica composite;

(a4) 15 g of 4,4,4-triphenylmethane triisocyanate and 7 g of benzimidazole derivative modified ZnS-mesoporous silica composite were added to 200 ml of dichloromethane solvent, 0.5 g of triethylamine was added as a catalyst, ultrasonically dispersed uniformly, after the reaction, the product was centrifuged and filtered to obtain a precipitate, the precipitate was washed with acetone, dried in a 60° C. oven for 12 h to obtain an isocyanate modified by the benzimidazole derivative modified ZnS-mesoporous silica;

(a5) 12 g of the isocyanate modified by the benzimidazole derivative modified ZnS-mesoporous silica prepared in step (a4) was added to 150 ml of tetrahydrofuran solvent, the resulting solution was added dropwise to 150 ml of tetrahydrofuran solution containing 16 g of polyether polyol under stirring, ultrasonically dispersed uniformly, and the solution was heated to 80° C. and reacted for 16 h under nitrogen protection. When bubbles were generated, 30 wt % acetone was added dropwise to reduce the viscosity, the dispersion was continued with stirring, then the acetone solvent was removed with a rotary evaporator to obtain a water-based polyurethane emulsion, and the emulsion was dried in a vacuum oven at 60° C. for 24 h to obtain an impact-resistant and aging-resistant reflective plastic.

EXAMPLE 4

A method for preparing impact-resistant and aging-resistant reflective plastic applied to automobiles, the specific preparation process is as follows:

(a1) 1 g of sodium N-lauroylglutamate was dissolved in a 0.5 M sodium hydroxide solution, titrated with a hydrochloric acid solution to neutrality, 3 g of zinc chloride was added, the pH was adjusted to 8, the mixture was ultrasonically dispersed uniformly, 1.5 g of γ-aminopropyltrimethoxysilane was added and mixed uniformly, then 6 g of ethyl orthosilicate was added to the above solution, stirred vigorously to obtain a suspension, after standing for 48 h, filtered to obtain a resulting precipitate, dried at room temperature, then calcined at 550° C. for 6 h in an air atmosphere, then hydrogen sulfide was introduced at a flow rate of 50 ml/min, and the resulting solid was calcined for 30 min to obtain a ZnS-mesoporous silica composite;

(a2) 3.5 g of the ZnS-mesoporous silica composite was added to 100 ml of N-methylpyrrolidone solvent, ultrasonically dispersed for 30 min, the N-methylpyrrolidone solution containing 0.2 g of silane coupling agent KH-560 was added to perform a reaction, the product was separated by centrifugation, and the precipitate was filtered, washed, and dried in an oven at 60° C. for 24 h to obtain an epoxy-grafted ZnS-mesoporous silica composite;

(a3) 2 g of the epoxy-grafted ZnS-mesoporous silica composite prepared in step (a2) and 3 g of 2-(2-hydroxy-5-aminophenyl)benzimidazole were added to 100 ml of tetrahydrofuran solvent, ultrasonically dispersed uniformly, after the reaction was completed, the product was filtered, washed and dried to obtain a benzimidazole derivative modified ZnS-mesoporous silica composite;

(a4) 3 g of 4,4,4-triphenylmethane triisocyanate and 2 g of benzimidazole derivative modified ZnS-mesoporous silica composite were added to 100 ml of dichloromethane solvent, 0.1 g of triethylamine was added as a catalyst, ultrasonically dispersed uniformly, after the reaction, the product was centrifuged and filtered to obtain a precipitate, the precipitate was washed with acetone, dried in a 60° C. oven for 12 h to obtain an isocyanate modified by the benzimidazole derivative modified ZnS-mesoporous silica;

(a5) 2.5 g of the isocyanate modified by the benzimidazole derivative modified ZnS-mesoporous silica prepared in step (a4) was added to 50 ml of tetrahydrofuran solvent, the resulting solution was added dropwise to 50 ml of tetrahydrofuran solution containing 3 g of polyether polyol under stirring, ultrasonically dispersed uniformly, and the solution was heated to 70° C. and reacted for 12 h under nitrogen protection. When bubbles were generated, 30 wt % acetone was added dropwise to reduce the viscosity, the dispersion was continued with stirring, then the acetone solvent was removed with a rotary evaporator to obtain a water-based polyurethane emulsion, and the emulsion was dried in a vacuum oven at 60° C. for 24 h to obtain an impact-resistant and aging-resistant reflective plastic.

COMPARATIVE EXAMPLE 1

A method for preparing impact-resistant and aging-resistant reflective plastic applied to automobiles, the specific preparation process is as follows:

(a1) 3 g of zinc chloride was dissolved in 0.5 M sodium hydroxide solution and titrated with a hydrochloric acid solution to neutrality, the mixture was ultrasonically dispersed uniformly, 1.5 g of γ-aminopropyltrimethoxysilane was added and mixed uniformly, then 5 g of silica nanoparticles were added to the above solution, stirred vigorously to obtain a suspension, after standing for 48 h, filtered to obtain a resulting precipitate, dried at room temperature, then calcined at 550° C. for 6 h in an air atmosphere, then hydrogen sulfide was introduced at a flow rate of 50 ml/min, and the resulting solid was calcined for 30 min to obtain a ZnS/silica composite;

(a2) 3.5 g of the ZnS/silica composite was added to 100 ml of N-methylpyrrolidone solvent, ultrasonically dispersed for 30 min, a N-methylpyrrolidone solution containing 0.2 g of silane coupling agent KH-560 was added, 3 g of 2-(2-hydroxy-5-aminophenyl)benzimidazole were added to 100 ml of tetrahydrofuran solvent, ultrasonically dispersed uniformly, and then mixed with a water-based polyurethane emulsion and polymerized to obtain an impact-resistant and aging-resistant reflective plastic.

COMPARATIVE EXAMPLE 2

A method for preparing a luminescent-reflective traffic-marking strip, the specific steps are as follows:

(a1) Preparation of pre-mixed luminescent-reflective particles: the luminescent powder and organic silica gel were mixed uniformly at a mass ratio of 1:2, sprayed evenly on the surface of reflective glass beads with 2 times the mass, after air drying, 0.5 ml of silicone oil was sprayed on the surface of every 100 g of glass beads, dried at 40° C. to obtain the luminescent glass beads, and then mixed uniformly with the uncoated reflective glass beads at a mass ratio of 1:1 to produce the pre-mixed luminescent-reflective particles;

(a2) Preparation of plastic matrix: In terms of weight percentage, 5 parts of rubber, 50 parts of plastic, 10 parts of fillers, 18 parts of pigments, 12 parts of additives, 5 parts of pre-mixed luminescent-reflective particles were weighed, the other components except rubber were placed into a high-speed mixer at 120° C. and mixed for 20 min, then heated to 150° C. and mixed with the rubber in an internal mixer for 10 min, and calendered into a plastic matrix sheet with a thickness of 2.5 mm in a calender at 160° C.;

(a3) Preparation of photoluminescent particles: the luminescent powder was calcined at 1100° C. for 6 h, then pelletized into 50 mesh luminescent particles by ball milling, the luminescent particles and polyurethane glue were mixed uniformly at a mass ratio of 14:1 to form coated particles, finally 2 ml of silicone oil was sprayed on the surface of 100 g of glass beads, and dried at 50° C. to obtain photoluminescent particles;

(a4) Spraying adhesive and spreading particles: the polyurethane adhesive was sprayed on the surface of the plastic matrix, 40 g of photoluminescent particles and 250 g of reflective glass beads were spread per square meter on the adhesive, and dried through a drying tunnel to obtain a luminescent-reflective plastic board.

Experiment

1) The plastics prepared in Examples 1-4 and Comparative Examples 1-2 were tested in accordance with the method of the industry standard JT/T493-2003 formulated by the Ministry of Transport of China using a FB-94 retroreflective performance tester (test conditions: an observation Angle of 0.2°, an incident angle of −4°); the tensile properties were tested by using an electronic tensile machine (SANS Test Machine Co., Ltd., Shenzhen, China) at a tensile speed of 500 mm/min; the plastic was also placed in a heat aging test box with a temperature of 100° C., an average wind speed of 0.5 m/s, and an air exchange rate of 50 times/h, and subjected to accelerated aging of heat and oxygen to observe the appearance and performance changes of the plastic; At room temperature, the impact resistance of the plastic was tested. The impact strength was measured according to the D-256 method of the American Society for Testing and Materials (ASTM). A test piece with a notch was fixed on one side of the pendulum impact tester. A cantilever beam was used to let the pendulum drop to hit the notch of the test piece to calculate the energy consumed by the pendulum impact tester. The test results are shown in Table 1. Among them, TS (tensile strength): the strength to the breaking point during stretching; EB (elongation at break): the ratio of the length to the breaking point during stretching and the change of the material.

TABLE 1

| sample | coefficient of retroreflection (mcd/1x$^{-1}$/m$^{-1}$) | tensile strength (MPa) | elongation at break (%) | appearance performance after the hot air exposure test for 1 h | impact strength (J/m) |
|---|---|---|---|---|---|
| Example 1 | 529 | 16.3 | 412.8 | no obvious change in plastic | 613.6 |
| Example 2 | 527.5 | 15.8 | 415 | no obvious change in plastic | 653.4 |
| Example 3 | 528 | 16.2 | 413.5 | no obvious change in plastic | 705.5 |
| Example 4 | 526.5 | 16.1 | 415.2 | no obvious change in plastic | 548.6 |
| Comparative Example 1 | 508 | 10.5 | 326.8 | no obvious change in plastic | 236.5 |
| Comparative Example 2 | 506 | 11.6 | 342.9 | no obvious change in plastic | 268.7 |

It can be seen from Table 1 that the impact-resistant and aging-resistant reflective plastics prepared in Examples 1-4 have high coefficient of retroreflection and strong tensile strength, and the elongation at break can reach more than 410%, which is much higher than 326.8% and 342.9% of Comparative Examples 1 and 2, after the hot air exposure test for 1 h, the plastics of Comparative Examples 1, 2 and Examples 1-4 all maintain good shapes, but the impact resistance of Examples 1-4 is much higher than that of Comparative Example 1, 2, this is because zinc sulfide and silicon dioxide with high strength are firmly grafted onto the polyurethane plastic through chemical bonds, so the dispersion is uniform and the stability is strong.

2) Further thermal oxidation aging to test the strength and impact resistance of Examples 1-4 and Comparative Examples 1-2: The dumbbell-shaped samples were placed in an air-circulating heating cabinet oven (GT-7017-E, Gotech Testing Machines Co., Ltd., Dongguan) to perform thermal oxidation accelerated aging at 100° C. After aging at different times (12, 24, 36 h), use an electronic tensile machine (SANSTest Machine Co., Ltd., Shenzhen, China) to test the tensile properties at a tensile speed of 500 mm/min Then, the retention rate of TS and EB was calculated as the ratio of the corresponding average data before and after aging, and the results are shown in Table 2.

TABLE 2

| item time | TS (tensile strength) retention rate | | | EB (elongation at break) retention rate | | | impact strength (J/m) | | |
|---|---|---|---|---|---|---|---|---|---|
| sample | 12 h | 24 h | 36 h | 12 h | 24 h | 36 h | 12 h | 24 h | 36 h |
| Example 1 | 100% | 102% | 107.5% | 96.30% | 93.50% | 90.30% | 503.6 | 423.4 | 290.6 |
| Example 2 | 100% | 103% | 106.5% | 97.00% | 94.00% | 90.50% | 563.4 | 485.3 | 306.1 |
| Example 3 | 100% | 105% | 108% | 96.80% | 94.20% | 91.90% | 612.7 | 504.3 | 343.5 |
| Example 4 | 100% | 102% | 107.5% | 97.20% | 93.40% | 90.20% | 487.5 | 398.5 | 286.6 |
| Comparative Example 1 | 96.30% | 90.60% | 86.50% | 93.50% | 90.50% | 85.50% | 127.6 | 72.6 | 16.8 |
| Comparative Example 2 | 89.60% | 83.60% | 79.60% | 90.60% | 88.30% | 83.20% | 135.8 | 79.6 | 19.4 |

It can be seen from Table 2 that the TS retention rate of the impact-resistant and aging-resistant reflective plastics prepared in Examples 1-4 increases with the increase of aging time, this is because in the early stage of aging, under the action of heat and oxygen, the inside of the plastic continues to form cross-linking, which makes the material harder, but leads to a decrease in EB. However, it can be seen from Table 2 that the reduction rate of the EB retention rate of the impact-resistant and aging-resistant reflective plastic prepared in Examples 1-4 is lower than that of Comparative Examples 1 and 2, and the impact strength of the Examples and Comparative Examples both decreases with the increase of aging time, but the impact strength of the Examples after 36 h of aging can still be maintained above 286 J/m, indicating the impact-resistant and aging-resistant reflective plastic prepared by the present disclosure has better anti-aging performance and mechanical performance.

In summary, the present disclosure provides a method for preparing the impact-resistant and aging-resistant reflective plastic applied to automobiles. By dispersing zinc sulfide in the pores of mesoporous carbon dioxide, chemical grafting 2-(2-hydroxy-5-aminophenyl)benzimidazole as a bridge onto isocyanate, and then polymerizing into polyurethane, which can improve the reflective performance and aging resistance of polyurethane, and improve the abrasion resistance and impact resistance. At the same time, it is rich in anti-aging molecules, benzotriazole can turn harmful ultraviolet light into harmless heat energy, zinc sulfide can effectively absorb and reflect ultraviolet light, and the silica crystal structure can refract light. When the plastic is subjected to external force, the uniformly dispersed mesoporous silica and zinc sulfide can effectively disperse the stress through its high strength, thereby improving the mechanical properties of the plastic.

For those skilled in the art, it is obvious that the present disclosure is not limited to the details of the foregoing exemplary embodiments, and the present disclosure can be implemented in other specific forms without departing from the spirit or basic characteristics of the present disclosure. Therefore, from any point of view, the embodiments should be regarded as exemplary and non-limiting. The scope of the present disclosure is defined by the appended claims rather than the foregoing description, and therefore it is intended to fall within the claims. All changes within the meaning and scope of the equivalent elements of are included in the present disclosure.

In addition, it should be understood that although this specification is described in accordance with the implementation manners, not each implementation manner only contains an independent technical solution. This narration in the specification is only for the sake of clarity, and those skilled in the art should regard the specification as a whole. The technical schemes in the various embodiments can also be appropriately combined to form other implementations that can be understood by those skilled in the art.

What is claimed is:

1. A method for preparing an impact-resistant and aging-resistant reflective plastic applied to an automobile, comprising the following steps:
(a1) dissolving sodium N-lauroylglutamate in a 0.5 M sodium hydroxide solution, titrating with a hydrochloric acid solution to neutrality, adding zinc chloride, adjusting the pH of the solution to 8, ultrasonically dispersing uniformly, adding γ-aminopropyltrimethoxysilane and mixing uniformly, then adding ethyl orthosilicate to the above solution, stirring vigorously to obtain a suspension, after standing for 48 h, filtering to obtain a resulting precipitate, drying at room temperature, then calcining at 550° C. for 6 h in an air atmosphere, and then calcining with hydrogen sulfide to obtain a ZnS-mesoporous silica composite;
(a2) adding the ZnS-mesoporous silica composite to a N-methylpyrrolidone solvent, dispersing ultrasonically for 30 min, adding a N-methylpyrrolidone solution containing a silane coupling agent to perform a reaction, separating by centrifugation, filtering and washing the precipitate, then drying in an oven at 60° C. for 24 h to obtain an epoxy-grafted ZnS-mesoporous silica composite;
(a3) adding the epoxy-grafted ZnS-mesoporous silica composite prepared in step (a2) and 2-(2-hydroxy-5-aminophenyl)benzimidazole to a tetrahydrofuran solvent, ultrasonically dispersing uniformly, after the completion of the reaction, filtering, washing and drying to obtain a benzimidazole derivative modified ZnS-mesoporous silica composite;
(a4) adding 4,4,4-triphenylmethane triisocyanate and the benzimidazole derivative modified ZnS-mesoporous silica composite into a dichloromethane solvent, adding triethylamine as a catalyst, ultrasonically dispersing uniformly, after the reaction, centrifuging and filtering to obtain a precipitate, washing the precipitate with acetone and drying to obtain an isocyanate modified by the benzimidazole derivative modified ZnS-mesoporous silica; and
(a5) adding the isocyanate modified by the benzimidazole derivative modified ZnS-mesoporous silica obtained in step (a4) to a tetrahydrofuran solvent, adding dropwise to a tetrahydrofuran solution containing polyether polyol under stirring, ultrasonically dispersing uniformly, subjecting a solution obtained after the ultrasonically dispersing to a further reaction until bubbles are generated, adding a 30 wt % acetone dropwise to reduce the viscosity, then stirring and dispersing, removing the acetone solvent using a rotary evaporator to obtain an aqueous polyurethane emulsion, and drying to obtain an impact-resistant and aging-resistant reflective plastic.

2. The preparation method of the impact-resistant and anti-aging reflective plastic applied to an automobile according to claim 1, wherein a mass ratio of sodium N-lauroylglutamate, zinc oxide, γ-aminopropyltrimethoxysilane and ethyl orthosilicate in step (a1) is 1:3-8:2-3:5-10.

3. The preparation method of the impact-resistant and anti-aging reflective plastic applied to an automobile according to claim 1, wherein a mass of the silane coupling agent in step (a2) is 5-15% of a mass of the ZnS-mesoporous silica composite, and the reaction in step (a2) is under a nitrogen atmosphere for 8-12 h.

4. The preparation method of the impact-resistant and anti-aging reflective plastic applied to an automobile according to claim 1, wherein a mass ratio of the epoxy-grafted ZnS-mesoporous silica composite to 2-(2-hydroxy-5-aminophenyl)benzimidazole in step (a3) is 15-18:20-25, and the reaction in step (a3) is at room temperature for 8 h.

5. The preparation method of the impact-resistant and anti-aging reflective plastic applied to an automobile according to claim 1, wherein a mass ratio of 4,4,4-triphenylmethane triisocyanate, benzimidazole derivative modified ZnS-mesoporous silica composite and catalyst in step (a4) is 10-20:3-7:0.1-0.5, and the drying in step (a4) is drying in an oven at 60° C. for 12 h.

6. The preparation method of the impact-resistant and anti-aging reflective plastic applied to an automobile according to claim 1, wherein a mass ratio of the isocyanate modified by the benzimidazole derivative modified ZnS-mesoporous silica to the polyether polyol in step (a5) is 3-6:3-4.

7. The preparation method of the impact-resistant and anti-aging reflective plastic applied to an automobile according to claim 1, wherein the further reaction is performed by heating the solution obtained after the ultrasonically dispersing to 70-80° C. and reacting for 12-18 h under the protection of nitrogen, and the drying in step (a5) is drying in a vacuum oven at 60° C. for 24 h.

* * * * *